(12) United States Patent
Hartinger et al.

(10) Patent No.: US 7,834,633 B2
(45) Date of Patent: Nov. 16, 2010

(54) MONITORING A PROTECTIVE DEVICE ARRANGED UPSTREAM OF A SWITCHING DEVICE

(75) Inventors: Peter Hartinger, Bodenwöhr (DE); Rainer Keil, Nürnberg (DE); Wolfgang Schatz, Amberg (DE)

(73) Assignee: Siemens Aktiengesellschaft, Munich (DE)

(*) Notice: Subject to any disclaimer, the term of this patent is extended or adjusted under 35 U.S.C. 154(b) by 303 days.

(21) Appl. No.: 12/084,915

(22) PCT Filed: Sep. 21, 2006

(86) PCT No.: PCT/DE2006/001681
§ 371 (c)(1),
(2), (4) Date: May 13, 2008

(87) PCT Pub. No.: WO2008/034394
PCT Pub. Date: Mar. 27, 2008

(65) Prior Publication Data
US 2009/0167289 A1 Jul. 2, 2009

(51) Int. Cl.
*G01R 31/00* (2006.01)
(52) U.S. Cl. .................. 324/415; 361/42; 361/93.1
(58) Field of Classification Search ............ 324/418, 324/424; 361/93.1, 93.6
See application file for complete search history.

(56) References Cited

U.S. PATENT DOCUMENTS 6,724,597 B1 * 4/2004 Elischer et al. ............ 361/93.6
6,738,246 B1 * 5/2004 Strumpler .................. 361/93.1

FOREIGN PATENT DOCUMENTS

DE   29 20 188 B1   3/1980
DE   100 40 633 A1  3/2002

* cited by examiner

*Primary Examiner*—Vincent Q Nguyen

(57) ABSTRACT

There is described a method and a system for monitoring a protective apparatus, which is connected upstream of a switching device and is connected to the switching device via at least one main current path. The wiring complexity for monitoring of the protective apparatus is minimized. This is achieved by virtue of the fact that the sate of the protective apparatus is determined by a tap of the at least one main current path at or in the switching device by means of an evaluation unit. As a result of this direct evaluation of the switching state of the protective organ on the switching device, the wiring which until now has been required for an addition auxiliary switch on the protective device is dispensed with a possible fault source also being minimized along with the wiring complexity. For this purpose, the proposed solution is also independent of the physical design (branch-oriented or row-oriented, distance between the devices) in a switchgear cabinet.

18 Claims, 1 Drawing Sheet

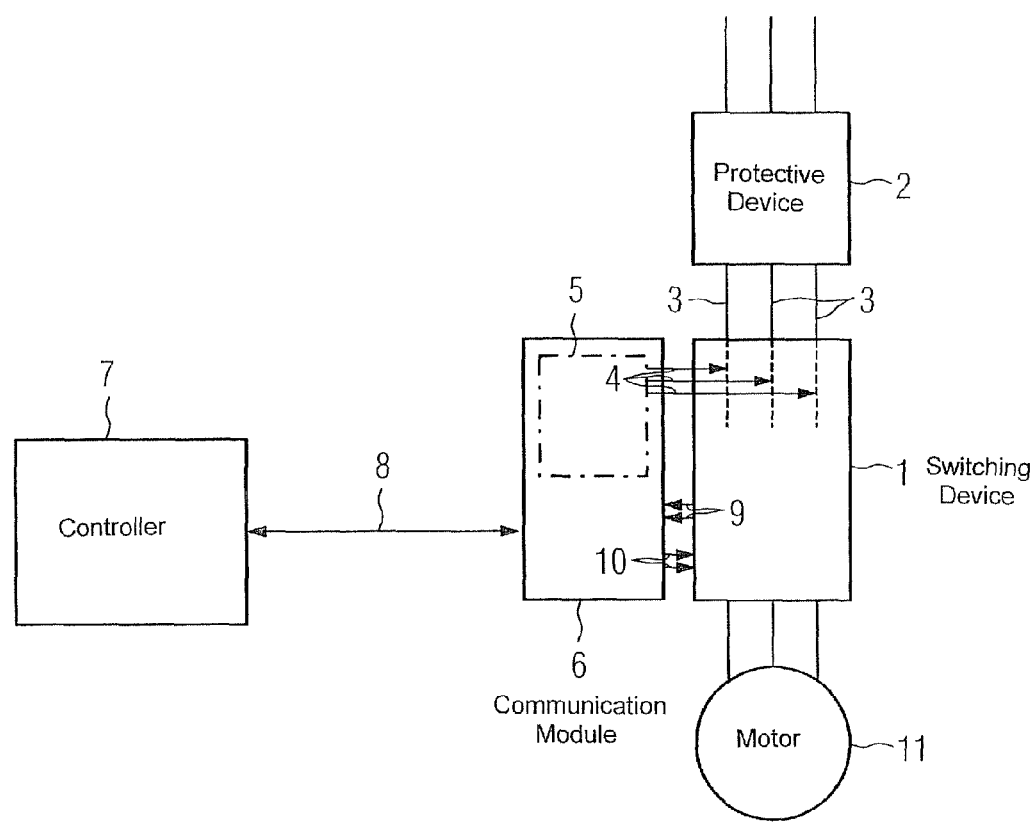

US 7,834,633 B2

MONITORING A PROTECTIVE DEVICE ARRANGED UPSTREAM OF A SWITCHING DEVICE

CROSS REFERENCE TO RELATED APPLICATIONS

This application is the US National Stage of International Application No. PCT/DE2006/001681, filed Sep. 21, 2006. The International Application is incorporated by reference herein in its entirety.

FIELD OF INVENTION

The invention relates to a method for monitoring a protective device that is arranged upstream of a switching device and is connected to the switching device by way of at least one main current path.

The invention relates furthermore to a system consisting of a switching device and a protective device arranged upstream thereof, that can be connected to one another via at least one main current path and to an evaluation unit.

BACKGROUND OF INVENTION

Such a method or system is used in particular in the case of load feeders such as for example motor starters. Switching devices for load feeders are used in switching systems for example, which are normally fused against short circuits and overloading at several levels (feeder, distributor, load). In such a case the state of the motor starter is characterized for example by the switching device controller, a contactor controller for instance, by the feedback relating to the state of the controlled switching device and by the report on the state of the at least one protective device that is arranged upstream thereof, which can be a circuit breaker for example.

The problem resides in the fact that, as a result of the typical configuration within the switch cabinet, wiring outlay is required for these signals, as several wiring lines, (typically six), are required for each feeder, either direct to a controller such as for example a programmable logic controller (PLC), or to a communications switch that is connected to the PLC via a communications interface such as for example a field bus system or a point-to-point interface. Even when communications systems are used to conserve wiring, the protective device must still be connected via wiring, as this wiring ensures that an auxiliary switch on the protective device transmits the report relating to the state of the protective device. However, an auxiliary switch on a circuit breaker does not recognize the lack of power supplied by the mains voltage. As a result of the high wiring outlay, these traditional solutions are not only costly in terms of time and money, but can also constitute a possible wiring error source.

SUMMARY OF INVENTION

An object underlying the invention is to specify a method and a system, with which the wiring outlay required to monitor a protective device arranged upstream of a switching device is minimized.

This object is achieved by a method for monitoring a protective device that is arranged upstream of a switching device and is connected to the switching device by way of at least one main current path, wherein the state of the protective device is determined by tapping into the at least one main current path on or in the switching device using an evaluation unit.

This object is also achieved by a system consisting of a switching device and a protective device which is arranged upstream thereof, the said devices being connectable via at least one main current path, and of an evaluation unit, with the evaluation unit for determining the state of the protective device being provided by tapping into the at least one main current path on or in the switching device.

The state of the upstream protective device is queried by tapping into the main current circuit on the switching device. This direct evaluation of the switching state of the protective organ on the switching device obviates the hitherto necessary wired connection to an additional auxiliary switch on the protective device, it also being possible to minimize a possible wiring error source and to minimize wiring outlay. To this end, the proposed solution is also independent of the spatial construction (feeder-based or line-based, distance between the devices) within a switch cabinet.

In an advantageous form of the embodiment the state of the protective device is determined by recording the voltage at the at least one main current path. Aside from the switching state of the protection device, additional information is herewith obtained in the simplest of manners in that a voltage is present on the switching device.

In a further advantageous embodiment, the tapping into the at least one main current path is integrated into the switching device and is, in each case, connected to a particular contact interface on the switching device via an electrically conductive connection. The evaluation unit, in the form of an additional module for example, can then be connected at these contact interfaces (contact points, contact surfaces or contact sites) without a further additional part being required.

In a further advantageous embodiment, the at least one main current path is tapped by an adapter on a particular fixed switching element belonging to the switching device, and the evaluation unit is connected to the adapter or integrated into the adapter. In this manner, tapping can take place with little or only minimal modifications to the switching device.

In a further advantageous embodiment, the evaluation unit is integrated into the switching device, as a result of which a compact and space saving construction is achieved.

In a further advantageous embodiment, the evaluation unit is mechanically connected to the switching device. Here, the connection can be realized for instance by means of a simple plug-in or snap-on connection.

In a further advantageous embodiment, a status signal relating to the state of the protective device is forwarded from the evaluation unit to a communications module which is connected to the switching device, and to a controller for the switching device, via at least one communications interface in each instance. The communications module is also required to transmit, as feedback from the switching signal to the controller, a status signal relating to the switching state of the switching device, as well as a control signal for the operational switching of the switching device from the controller to the switching device. In this process, the communications interface between communications module and controller can also be implemented as a field bus system or a point-to-point interface for example. In this way, further wiring outlay, especially from the evaluation unit to the controller, is spared. Furthermore, tapping into the at least one main current path makes further communication module functions possible, such as for example monitoring for phase loss or monitoring phase sequence.

In a further advantageous embodiment, the evaluation unit is integrated into the communications module and/or the communications module is integrated into the switching device, which again results in a compact and space-saving construction. The communications module is advantageously mechanically connected here to the switching device.

BRIEF DESCRIPTION OF THE DRAWINGS

The invention is described and explained in greater detail below with reference to the exemplary embodiment illustrated in the figures, in which:

FIG. 1 shows a schematic representation of a motor starter with monitoring of the upstream protective organ on the switching device.

DETAILED DESCRIPTION OF INVENTION

FIG. 1 shows a switching device 1 and a protective organ 2 arranged upstream thereof which are connected via three main current paths 3. In this case the switching device 1 is designed as a contactor and the upstream protective device 2 as a circuit breaker. A motor 11 is connected to the contactor 1 via the three main current paths 3 and a communications module 6 is connected thereto via two communications interfaces 9, 10. In such a case, a control signal for the operational switching of the switching device 1 is given to the switching device 1 via the communications interface 10 by a controller 7, in particular a programmable logic controller (PLC). In the case illustrated, the contactor 1 is coil-controlled for example. A status signal relating to the switching state of the switching device 1 is then sent back to the communications module 6 via the communications interface 9, as feedback from the switching signal. This can be achieved for example via an auxiliary switch on the contactor 1. In this case, the control signal and the status signal are exchanged between the communications module 6 and the PLC 7 via a communications interface 8, which can be a field bus system or a point-to-point interface for example. The state of the starter motor is now characterized by the controller for the contactor 1, the feedback of the state of the switching device and a report on the state of the upstream circuit breaker 2. According to the invention, the state of the upstream protective device 2 is queried by an evaluation unit 5 via a tapping 4 into the main current paths 3 on the switching device 1. In this case, the evaluation unit 5 detects whether there is any voltage on the switching device 1 and generates a "Ready" signal if there is; this signal is then forwarded to the PLC 7 via the communications module 6. In the case illustrated, the evaluation unit 5 is integrated into the communications module 6, as a result of which the wiring outlay required is reduced. An additional reduction in wiring outlay results if the communications module 6 is designed to be mechanically connectable to the switching device 1, so that for example if the communications module 6 is plugged directly onto the contactor 1 by means of contact interfaces provided for that purpose in the contactor housing, wiring is no longer required between the contactor 1 and the communications module 6.

In summary, the invention relates to a method and a system for monitoring a protective device that is arranged upstream of a switching device and is connected to the switching device by way of at least one main current path. The object underlying the invention is to specify a method and a system, with which the wiring outlay required to monitor a protective device is minimized. This object is achieved in that the state of the protective device is determined by means of an evaluation unit tapping into the at least one main current path on or in the switching device. This direct evaluation of the switching state of the protective organ on the switching device obviates the hitherto necessary wired connection to an additional auxiliary switch on the protective device, it being possible to minimize a possible source of faults as well as minimizing wiring outlay. To this end, the proposed solution is also independent of the spatial construction (feeder-based or line-based, distance between the devices) within a switch cabinet.

The invention claimed is:

1. A method for monitoring protective device that is arranged upstream of a switching device, comprising:
   providing a protective device;
   providing a switching device, wherein the protective device is electrically connected to the switching device via at least one main current path; and
   determining a state of the protective device by tapping into the at least one main current path on or in the switching device using an evaluation unit,
   wherein the tapping has an adapter on a particular fixed contact belonging to the switching device and wherein the evaluation unit is connected to the adapter or integrated into the adapter.

2. The method as claimed in claim 1, wherein the state of the protective device is determined by recording the voltage on the at least one main current path.

3. The method as claimed in claim 1, wherein the evaluation unit is integrated into the switching device.

4. The method as claimed in claim 1, wherein the evaluation unit is mechanically connected to the switching device.

5. A method for monitoring a protective device that is arranged upstream of a switching device, comprising:
   providing a protective device;
   providing a switching device, wherein the protective device is electrically connected to the switching device via at least one main current path; and
   determining a state of the protective device by tapping into the at least one main current path on or in the switching device using an evaluation unit,
   wherein a status signal regarding the state of the protective device is forwarded from the evaluation unit to a communications module that is connected to the switching device and to a controller for the switching device via at least one communications interface in each instance.

6. The method as claimed in claim 5, wherein the tapping into the at least one main current path is integrated into the switching device, and wherein the tapping is connected in each case to a particular contact interface on the switching device via an electrically conductive connection.

7. The method as claimed in claim 5, wherein the evaluation unit is integrated into the communications module.

8. The method as claimed in claim 5, wherein the communications module is integrated into the switching device.

9. The method as claimed in claim 5, wherein the communications module is mechanically connected to the switching device.

10. The method as claimed in claim 5, wherein the state of the protective device is determined by recording the voltage on the at least one main current path.

11. A system, comprising:
   a switching device;
   a protective device upstream the switching device, wherein the switching device and the protective device are connectable via at least one main current path;
   an evaluation unit to evaluate a state of the protective device by tapping into the at least one main current path on or in the switching device; and
   an adapter on a particular fixed contact belonging to the switching device for the tapping into the at least one main current stream, wherein the evaluation unit is connected to the adapter or integrated therein.

12. The system as claimed in claim 11, wherein the evaluation unit determines the state of the protective device by recording the voltage on the at least one main current path.

13. The system as claimed in claim 11, wherein the evaluation unit is integrated into the switching device.

14. The system as claimed in one of claims 11, wherein the evaluation unit and/or the switching device have means for producing a disconnectable mechanical connection with one another.

15. The system as claimed in one of claims 11, further comprising a communications module connected to the switching device and to a controller for the switching device via at least one communications interface in each case, wherein the evaluation unit forwards a status signal regarding the state of the protective device.

16. The system as claimed in claim 15, wherein the evaluation unit is integrated into the communications module.

17. The system as claimed in claim 15, wherein the communications module is integrated into the switching device.

18. The system as claimed in one of claims 15, wherein the communications module and/or the switching device have means for producing a disconnectable mechanical connection with one another.

* * * * *